United States Patent
Yamada et al.

(10) Patent No.: US 10,293,857 B2
(45) Date of Patent: May 21, 2019

(54) REACH VEHICLE-BODY STRUCTURE OF VEHICLE

(71) Applicant: MAZDA MOTOR CORPORATION, Hiroshima (JP)

(72) Inventors: Ken Yamada, Hatsukaichi (JP); Koji Yoshimura, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/696,233

(22) Filed: Sep. 6, 2017

(65) Prior Publication Data
US 2018/0065670 A1    Mar. 8, 2018

(30) Foreign Application Priority Data
Sep. 6, 2016   (JP) ................................ 2016-173449

(51) Int. Cl.
| | | |
|---|---|---|
| *B62D 21/15* | (2006.01) | |
| *B62D 25/20* | (2006.01) | |
| *B60R 19/34* | (2006.01) | |
| *B62D 21/02* | (2006.01) | |
| *B62D 27/06* | (2006.01) | |
| *B62D 29/00* | (2006.01) | |

(52) U.S. Cl.
CPC ............ *B62D 21/152* (2013.01); *B60R 19/34* (2013.01); *B62D 21/02* (2013.01); *B62D 25/2027* (2013.01); *B62D 27/065* (2013.01); *B62D 29/007* (2013.01)

(58) Field of Classification Search
CPC ...... B62D 21/15; B62D 21/152; B62D 21/02; B62D 25/2027; B60R 19/34

USPC ............ 296/203.01, 203.04, 187.11, 193.08
See application file for complete search history.

(56) References Cited

U.S. PATENT DOCUMENTS

| | | | | |
|---|---|---|---|---|
| 4,684,151 A | * | 8/1987 | Drewek | B62D 21/152 280/784 |
| 5,308,115 A | * | 5/1994 | Ruehl | B62D 21/02 280/785 |
| 6,893,078 B2 | * | 5/2005 | Saeki | B62D 21/152 296/187.09 |
| 2007/0138840 A1 | * | 6/2007 | Caliskan | B62D 25/08 296/205 |
| 2008/0007088 A1 | * | 1/2008 | Newport | B21C 1/24 296/187.03 |

FOREIGN PATENT DOCUMENTS

| | | |
|---|---|---|
| JP | 2000-318655 A | 11/2000 |
| JP | 2004-028135 A | 1/2004 |
| JP | 2005-067346 A | 3/2005 |
| JP | 2008-247360 A | 10/2008 |
| JP | 2011-056997 A | 3/2011 |

* cited by examiner

*Primary Examiner* — Dennis H Pedder
(74) *Attorney, Agent, or Firm* — Studebaker & Brackett PC

(57) ABSTRACT

A rear side frame comprises a front-side frame and a rear-side frame which is provided in back of the front-side frame and configured such that a strength thereof against compressing of an axial direction is lower than that of the front-side frame, a rear end portion of the front-side frame and a front end portion of the rear-side frame are overlapped, and another vehicle-body member is connected to an overlap portion where the rear end portion of the front-side frame and the front end portion of the rear-side frame are overlapped.

6 Claims, 13 Drawing Sheets

Vehicle-Body Rearward Side              Vehicle-Body Forward Side

REACH VEHICLE-BODY STRUCTURE OF VEHICLE

BACKGROUND OF THE INVENTION

The present invention relates to a rear vehicle-body structure of a vehicle, and in particular, relates to the rear vehicle-body structure of the vehicle which is provided with rear side frames.

A structure of a vehicle, such as an automotive vehicle, in which a crash can is interposed between a rear bumper reinforcement extending in a vehicle width direction and a rear side frame extending in a vehicle longitudinal direction at a rear portion of a vehicle body so that when an impact load is applied from behind the vehicle body in a rear face collision (rear collision), the crash can is crushed in a folded manner so as to absorb impact energy, is known.

Further, a structure which improves the impact-energy absorption performance in the vehicle rear collision by using the rear side frame is known. Japanese Patent Laid-Open publication No. 2011-056997, for example, discloses a structure in which a linear-shaped recess portion is formed at a ridge line of a metal-made hollow pole-shaped member which is applicable to the rear side frame such that an angle which the line-shaped recess portion forms with a direction of the ridge line is within a range of 20-70 degrees, thereby improving the impact-energy absorption performance by generating bellows-shaped buckling when the impact load is applied in an axial direction of the pole-shaped member.

In recent years, it is required for the vehicle, such as the automotive vehicle, to further improve the impact-energy absorption performance in the vehicle rear collision to improve the safety of passengers in a cabin, specifically to further increase the amount of impact-energy absorption when the impact load is applied from behind the vehicle body in the vehicle rear collision.

SUMMARY OF THE INVENTION

Accordingly, an object of the present invention is to provide a rear vehicle-body structure of a vehicle which can increase the amount of impact-energy absorption in the vehicle rear collision, thereby improving the safety of passengers in the cabin.

The present invention is a rear vehicle-body structure of a vehicle which is provided with a pair of right-and-left rear side frames extending in a vehicle longitudinal direction at a vehicle-body rear portion, wherein each of the rear side frames comprises a front-side frame and a rear-side frame which is provided in back of the front-side frame and configured such that a strength thereof against compressing of an axial direction thereof is lower than that of the front-side frame, a rear end portion of the front-side frame and a front end portion of the rear-side frame are overlapped, and another vehicle-body member is connected to an overlap portion where the rear end portion of the front-side frame and the front end portion of the rear-side frame are overlapped.

According to the present invention, the rear side frame comprises the front-side frame and the rear-side frame which is provided in back of the front-side frame and configured such that the strength thereof against the compressing of its axial direction is lower than that of the front-side frame, and the rear end portion of the front-side frame and the front end portion of the rear-side frame are overlapped.

Thereby, since the rear side frame is split into the front-side frame and the rear-side frame, and the strength of respective elements against the compressing of the axial direction of the elements is configured such that the strength of the front-side frame excluding the overlap portion with the rear-side frame is greater than the strength of the rear-side frame excluding the overlap portion with the front-side frame, and the strength of the overlap portion of the front-side and rear-side frames is greater than the strength of the front-side frame excluding the overlap portion with the rear-side frame, the front-side frame can be crushed and deformed after the rear-side frame which is apart from the cabin has been crushed and deformed in the vehicle rear collision, thereby suppressing of any breakage of the rear side frame and improving the safety of passengers in the cabin.

Further, since the other vehicle-body member is connected to the overlap portion where the rear end portion of the front-side frame and the front end portion of the rear-side frame are overlapped, that is, connected to the portion which has the high strength against the compressing of the axial direction, the front-side frame excluding the overlap portion and the rear-side frame excluding the overlap portion can be crushed and deformed properly, without blocking crushing and deformation of these frame portions, compared with a case where the above-described other member is connected to the rear side frame at a different position from the overlap portion. Consequently, the amount of collision-energy absorption in the vehicle rear collision is so increased that the safety of passengers in the cabin can be improved.

In an embodiment of the present invention, the above-described other vehicle-body member extends in a vehicle width direction and is joined to the above-described overlap portion which is provided at each of the pair of right-and-left rear side frames.

According to this embodiment, since the other vehicle-body member extends in the vehicle width direction and is joined to the overlap portion which is provided at each of the pair of right-and-left rear side frames, the impact energy in the vehicle rear collision can be absorbed by using the right-and-left rear side frames, thereby providing the above-described effects properly.

In another embodiment of the present invention, the other vehicle-body member includes a cross member which extends in the vehicle width direction and is laid between the pair of right-and-left rear side frames.

According to this embodiment, since the other vehicle-body member includes the cross member which extends in the vehicle width direction and is laid between the pair of right-and-left rear side frames, the above-described effects can be concretely achieved in a case where the cross member is laid between the rear side frames.

In another embodiment of the present invention, the rear side frame is formed by overlapping the rear end portion of the front-side frame and the front end portion of the rear-side frame are overlapped in a state where the front end portion of the rear-side frame is inserted into an inside of the rear end portion of the front-side frame.

According to this embodiment, since the rear side frame is formed by overlapping the rear end portion of the front-side frame and the front end portion of the rear-side frame are overlapped in the state where the front end portion of the rear-side frame is inserted into the inside of the rear end portion of the front-side frame, the strength of the overlap portion of the rear end portion of the front-side frame and the front end portion of the rear-side frame against the compressing of the axial direction can be higher than that of the front-side or rear-side frames excluding the above-described overlap portion, thereby providing the above-described effects properly.

In another embodiment of the present invention, the rear-side frame is made of a steel plate which has a thinner plate thickness than the front-side frame.

According to this embodiment, since the rear-side frame is made of the steel plate having the thinner plate thickness than the front-side frame, the above-described effects can be provided relatively easily by changing the steel plates used for the front-side frame and the rear-side frame.

In another embodiment of the present invention, the rear-side frame is made of a steel plate which has a lower tensional strength than the front-side frame.

According to this embodiment, since the rear-side frame is made of the steel plate having the lower tensional strength than the front-side frame, the above-described effects can be provided relatively easily by changing the steel plates which have different a tensional strength which relates to the strength against the compressing of the axial direction, which are used for the front-side frame and the rear-side frame.

Other features, aspects, and advantages of the present invention will become apparent from the following description which refers to the accompanying drawings.

BRIEF DESCRIPTION OF THE DRAWINGS

FIG. is a bottom view of a vehicle body to which a rear vehicle-body structure of a vehicle according to a first embodiment of the present invention is applied.

DETAILED DESCRIPTION OF THE INVENTION

Hereafter, embodiments of the present invention will be described referring to the accompanying drawings.

Figure 1:
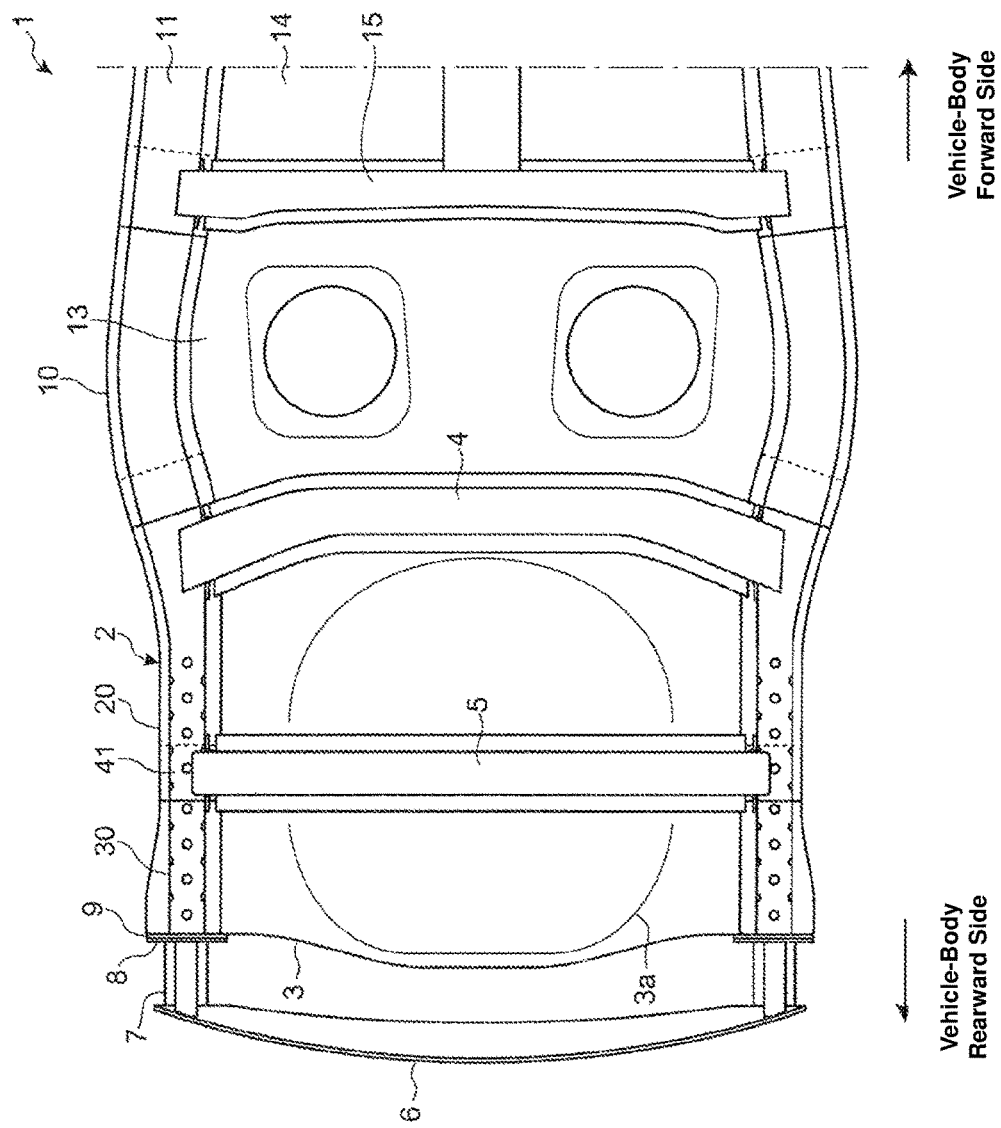
Figure 2:
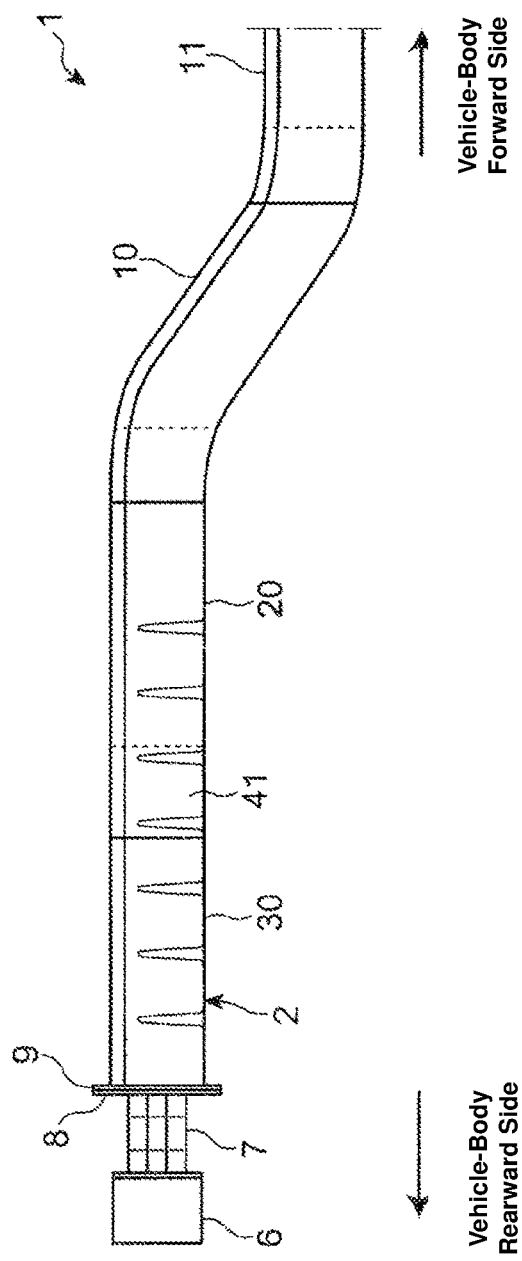
FIG. 2 is a side view of the vehicle body to which the rear vehicle-body structure of the vehicle according to the first embodiment of the present invention is applied.
Figure 3:
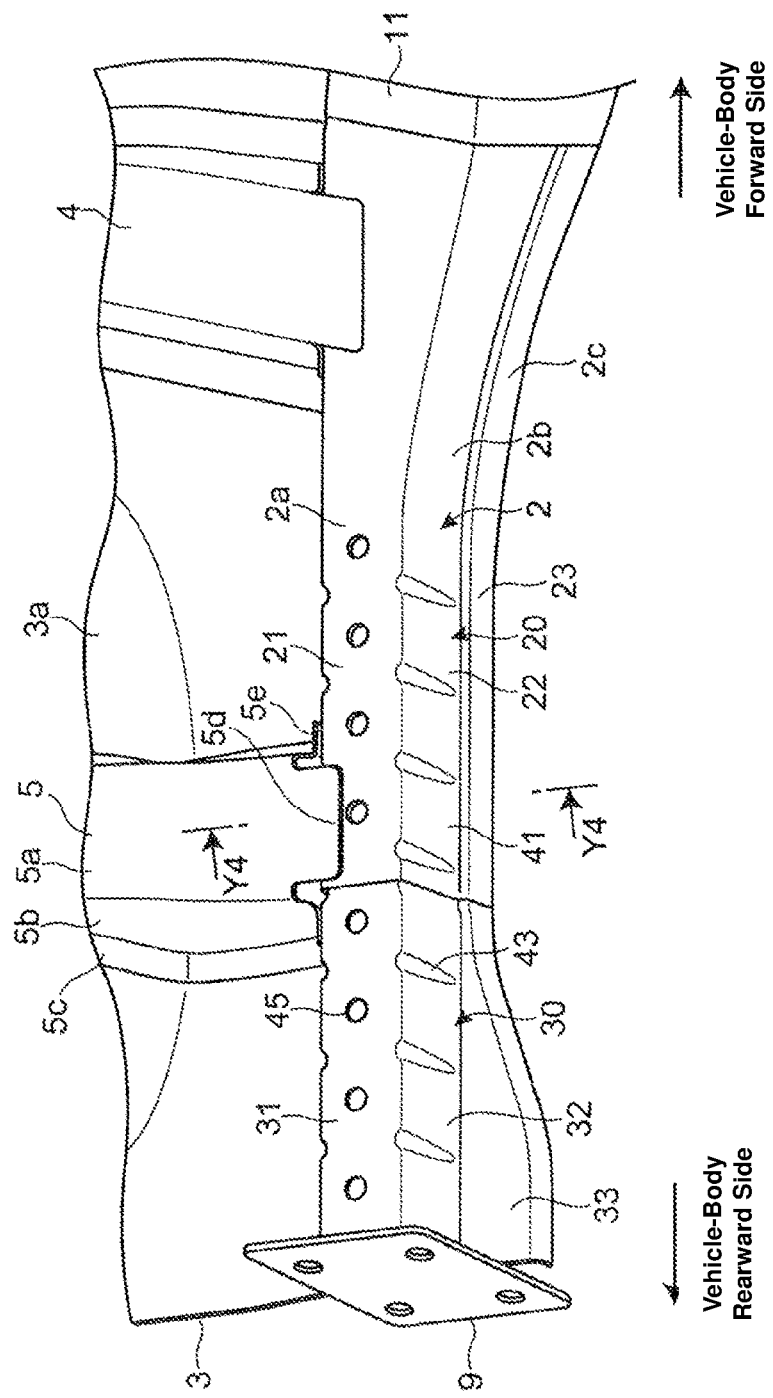
FIG. 3 is a perspective view showing a major part of the vehicle body shown in FIG. 1.
Figure 4:
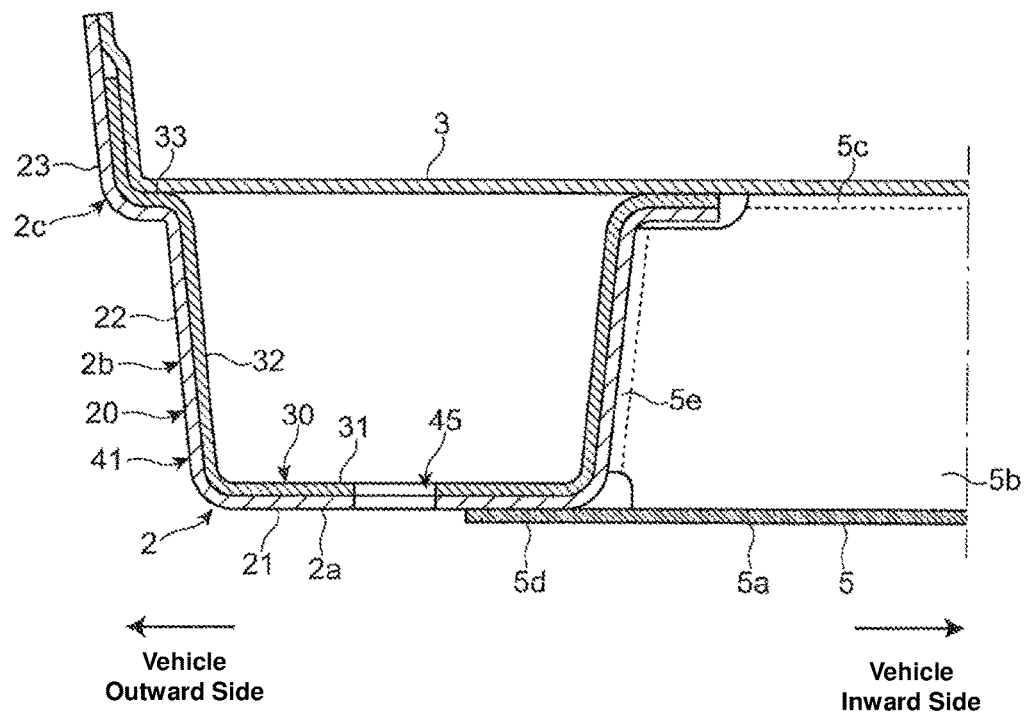
FIG. 4 is a sectional view of the vehicle body taken along line Y4-Y4 of FIG. 3.

FIG. 1 is a bottom view of a vehicle body to which a rear vehicle-body structure of a vehicle according to a first embodiment of the present invention is applied, FIG. 2 is a side view of the vehicle body to which the rear vehicle-body structure of the vehicle according to the first embodiment of the present invention is applied, FIG. 3 is a perspective view showing a major part of the vehicle body shown in FIG. 1, and FIG. 4 is a sectional view of the vehicle body taken along line Y4-Y4 of FIG. 3.

As shown in FIGS. 1 through 4, a vehicle body 1 to which a rear vehicle-body structure of a vehicle according to the first embodiment of the present invention is applied comprises a pair of right-and-left rear side frames 2 which extend in a vehicle longitudinal direction, a rear floor panel 3 which is laid between the pair of right-and-left rear side frames 2, and a No. 4 cross member 4 and a No. 5 cross member 5 which respectively extend in a vehicle width direction below of the rear floor panel 3 and are laid between the pair of right-and-left rear side frames 2, being spaced, in the vehicle longitudinal direction, apart from each other.

The No. 4 cross member 4 is provided to interconnect respective forward sides of the right-and-left rear side frames 2. The No. 5 cross member 5 is provided to interconnect respective central sides, in the vehicle longitudinal direction, of the right-and-left rear side frames 2 and arranged below a spare-tire storage portion 3a which is configured to be concaved downward at the rear floor panel 3.

The rear side frame 2 has a roughly U-shaped cross section and is attached at a lower face side of the rear floor panel 3, and cooperates with the rear floor panel 3 to form a closed cross section extending in the vehicle longitudinal direction. The No. 4 cross member 4 and the No. 5 cross member 5 respectively have a roughly hat-shaped cross section and are attached at the lower face side of the rear floor panel 3, and cooperate with the rear floor panel 3 to form a closed cross section extending in the vehicle with direction.

Respective rear end portions of the right-and-left rear side frames 2 are attached to crash cans 7 which are respectively provided at both end portions of a rear bumper reinforcement 6 which is arranged inside a rear bumper (not illustrated) which extends in the vehicle width direction at a vehicle-body rear portion. The crash can 7 is configured to be crushable in a folded manner so as to absorb impact energy when an impact load is applied from behind the vehicle body 1 in a vehicle rear collision.

A first plate member 8 which extends in a direction roughly perpendicular to the vehicle longitudinal direction is fixedly attached to a front end portion of the crush can 7 by welding or the like, and a second plate member 9 which extends in the direction roughly perpendicular to the vehicle longitudinal direction is fixedly attached to a rear end portion of the rear side frame 2 by welding or the like.

The first and second plate members 8, 9 are respectively formed in a roughly rectangular shape, and four bolt insertion holes are respectively formed at their peripheral edge portions. The first and second plate members 8, 9 are fastened by using bolts inserted into the four bolt insertion holes and nuts, whereby the crush can 7 and the rear side frame 2 are connected and the rash can 7 is disposed between the rear bumper reinforcement 6 and the rear side frame 2.

A front end portion of the rear side frame 2 is overlapped with and connected to a rear end portion of a kick-up frame 10 which is configured to extend obliquely outward and downward toward the vehicle forward side, and a front end portion of the kick-up frame 10 is overlapped with and connected to a rear end portion of the front floor frame 11 extending in the vehicle longitudinal direction.

Between the right-and-left kick-up frames 10 is laid a center floor panel 13 which is provided in front of the rear floor panel 3 and extends obliquely forward and downward, and a front floor panel 14 which is provided in front of the center floor panel 13 is laid between the right-and-left front floor frames 11. A cabin is formed on the front floor panel 14 of the vehicle body 1.

The lick-up frame 10 has a roughly hat-shaped cross section and is attached at a lower face side of the center floor panel 13, and cooperates with the center floor panel 13 to form a closed cross section extending in the vehicle longitudinal direction. The front floor frame 11 has a roughly hat-shaped cross section and is attached at a lower face side of the front floor panel 14, and cooperates with the front floor panel 14 to form a closed cross section extending in the vehicle longitudinal direction.

At the lower face side of the front floor panel 14 are also attached plural cross members which extend in the vehicle width direction and are laid between the right-and-left front floor frames 11, being spaced apart from each other.

As show in FIG. 1, a No. 3 cross member 15 is laid between the right-and-left front floor frames 11 in front of the No. 4 cross member 4. The No. 3 cross member 15 has a roughly hat-shaped cross section and is attached at the lower face side of the front floor panel 14, and cooperates with the front floor panel 14 to form a closed cross section extending in the vehicle with direction. The other cross members laid between the right-and-left front floor frame 11 are configured similarly to the No. 3 cross member 15.

Next, the rear side frame 2 of the vehicle body 1 according to the present embodiment will be described. As shown in FIGS. 3 and 4, the rear side frame 2 comprises a lower face portion 2a, side face portions 2b which are provided at both sides of the lower face portion 2a to extend roughly perpendicularly from the lower face portion 2a and has a roughly U-shaped cross section. The rear side frame 2 further includes flange portions 2c which are provided at both sides of the side face portion 2b to extend outward, and the both-side flange portions 2c are attached to the rear floor panel 3.

In the present embodiment, the rear side frame 2 comprises longitudinally-split parts of a front-side frame 20 which is arranged on a forward side of the vehicle body and a rear-side frame 30 which is arranged in back of the front-side frame 20, and a rear end portion of the front-side fame 20 and a front end portion of the rear-side frame 30 are overlapped and joined.

The front-side frame 20 and the rear-side frame 30 respectively comprise lower face portions 21, 31 and side face portions 22, 32 which respectively extend from and roughly perpendicularly to the lower face portions 21, 31 on both sides, and respectively have a roughly U-shaped cross section. Further, the both-side side face portions 22, 32 of the front-side frame 20 and the rear-side frame 30 are respectively provided with both-side flange portions 23, 33 which extend outward, and the both-side flange portions 23, 33 are attached to the rear floor panel 3.

The rear end portion of the front-side frame 20 and the front end portion of the rear-side frame 30 are overlapped in a state where the front end portion of the rear-side frame 30 is inserted into an inside of the rear end portion of the front-side frame 20, and an overlap portion 41 where the rear end portion of the front-side frame 20 and the front end portion of the rear-side frame 30 are overlapped is fixed joined by welding or the like as shown in FIG. 4.

In the present embodiment, for example, the rear-side frame 30 is formed by pressing a steel plate with a plate thickness of 1.4 mm and the front-side frame 20 is formed by pressing a steel plate with the plate thickness of 1.6 mm. Thus, the rear-side frame 30 is made of a thinner steel plate than the front-side frame 20 so that the strength of the rear-side frame 30 against compressing of the axial direction is lower than that of the front-side frame 20. Thereby, in the rear side frame 2 of the present embodiment, the strength of the front-side frame 20 excluding the overlap portion 41 against compressing of the axial direction is greater than that of the rear-side frame 30 excluding the overlap portion 41, and the strength of the overlap portion 41 against compressing of the axial direction is greater than that of the front-side frame 20 excluding the overlap portion 41.

As shown in FIG. 3, the rear side frame 2 includes recess portions 43 as a first deformation promotion portion to promote inward deformation of the rear side frame 2 at the both-side side face portions 2b. The recess portion 43 is configured to extend in a direction roughly perpendicular to an axial direction of the rear side frame 2 along the side face portion 2b from a lower-face portion side of the rear side frame 2 toward an anti-lower-face portion side of the rear side frame 2 and to be recessed toward an inside of the rear side frame 2.

Figure 5A:
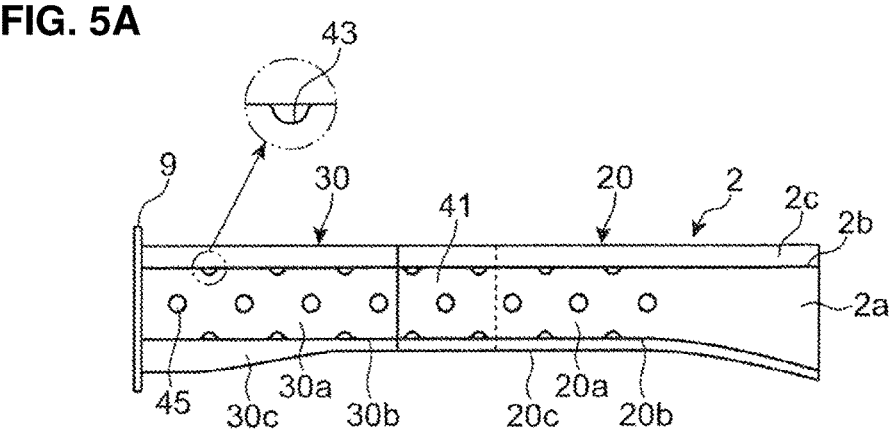
FIGS. 5A and 5B are a bottom view and a side view of a rear side frame.
Figure 5B:
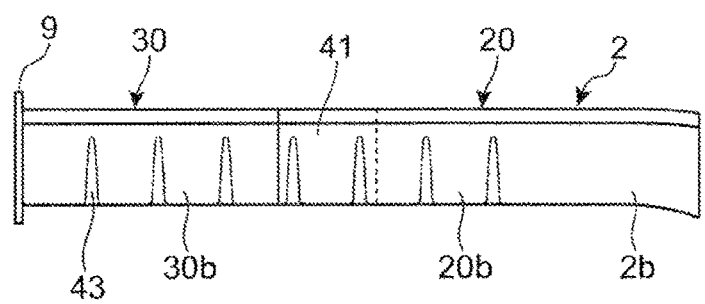

FIGS. 5A and 5B are respectively a bottom view and a side view of the rear side frame. As shown in FIG. 5A, the plural recess portions 43 provided at the both-side side face portions 2b of the rear side frame 2 are arranged at the same position in the axial direction of the rear side frame 2 substantially at regular intervals.

Each recess portion 43 is configured such that its width becomes narrower toward the upward side as shown in FIG. 5B. The recess portion 43 is also configured such that its cross section is of a roughly semicircular shape and its depth and opening width becomes smaller toward the upward side. Herein, the recess portion 43 may be configured to have another shaped cross section, such as a roughly rectangular-shaped cross section.

The rear side frame 2 further includes opening portions 45 as a second deformation promotion portion to promote outward deformation of the rear side frame 2 at the lower face portion 2a. Each of the opening portions 45 is of a circular shape, and the plural opening portions 45 are formed at a central side, in the vehicle width direction, of the lower face 2a of the rear side frame 2 substantially at regular intervals, being spaced apart from each other in the axial direction of the rear side frame 2. Herein, the opening portion 45 may be configured to have another shape, such as a slot shape.

As shown in FIG. 5A, the recess portions 43 and the opening portions 45 are alternately arranged in the axial direction of the rear side frame 2, and each opening portion 45 which is formed at the lower face portion 2a of the rear side frame 2 is disposed at a substantially middle position between the two adjacent recess portions 43 which are formed at the side faces 2b of the rear side frame 2 in the axial direction of the rear side frame 2.

In the present embodiment, the rear side frame 2 comprises the split front-side and rear-side frames 20, 30, the recess portions 43 are formed at the side face portions 22, 32 of the front-side and rear-side frames 20, 30, and the opening portions 45 are formed at the lower face portions 21, 31 of the front-side and rear-side frames 20, 30.

Since the recess portions 43 and the opening portions 45 are alternately arranged in the axial direction of the rear side frame 2, when the impact load is applied from behind the vehicle body in the vehicle rear collision, the inward deformation of the rear side frame 2 is promoted by the recess portions 43 and also the outward deformation of the rear side frame 2 is promoted by the recess portions 43. Thereby, the rear side frame 2, in particular, the side face portions 2b of the rear side frame 2 can be crushed and deformed in the bellows-shaped folded manner in the axial direction, so that the amount of impact-energy absorption is so increased in the vehicle rear collision that the safety of passengers in the cabin can be improved.

As described above, the No. 5 cross member 5 is laid between the rear side frames 2, and the No. 5 cross member 5 is connected to the overlap portion 41 of the rear end portion of the front-side frame 20 of the rear side frame 2 and the front end portion of the rear-side frame 30 of the rear side frame 2 as shown in FIGS. 3 and 4. The right-and-left rear side frames 2 are configured similarly and the No. 5 cross member 5 is connected to the overlap portion 41 of one of the rear side frames 2 and the overlap portion 41 of the other rear side frame 2 at its both end portions.

As shown in FIG. 3, the No. 5 cross member 5 comprises a lower face portion 5a, side face portions 5b which are provided at both sides of the lower face portion 2a to extend roughly perpendicularly from the lower face portion 5a, and both-side flange portions 5c which are provided to extend outward from the both-side side face portions 5b, and has a roughly U-shaped cross section. The both-side flange portions 5c are attached at the lower-face side of the rear floor panel 3.

The No. 5 cross member 5 is further provided with flange portions 5d which extend in the axial direction from the lower face portion 5a and both-side flange portions 5e which extend outward in a direction roughly perpendicular to and from the both-side side face portions 5b.

The flange portions 5d of the No. 5 cross member 5 are connectedly attached to the lower face portion 2a of the rear side frame 2 at the overlap portion 41 of the rear side frame 2 by welding or the like. The both-side flange portions 5e of the No. 5 cross member 5 are connectedly attached to the inward-side side face portion 2b of the rear side frame 2 at the overlap portion 41 of the rear side frame 2 by welding or the like.

In a case where the impact load is applied to the above-described vehicle body 1, when the load is inputted to the rear side frame 2 after the crash cans 7 are crushed, the rear side frame 2 is crushed and deformed in such a manner that the rear-side frame 30 excluding the overlap portion 41 is crushed first and then the front-side frame 20 excluding the overlap portion 41 is crushed before the overlap portion 41 of the front-side frame 20 and the rear-side frame 30 has been crushed, thereby absorbing the impact energy.

Further, since the recess portions 43 as the first deformation promotion portion and the opening portions 45 as the second deformation promotion portion are alternately arranged in the axial direction, the rear side frame 2 is crushed and deformed in the bellows-shaped folded manner in the axial direction, thereby absorbing the impact energy.

While the rear-side frame 30 of the present embodiment is configured such that the strength thereof against the compressing of the axial direction is set to be low by using the thinner steel plate than the front-side frame 20, a high-tensile steel plate having the tensional strength of 590 MPa or greater may be used for the rear-side frame 30 and another high-tensile steel plate having the tensional strength of 780 MPa or greater may be used for the rear-side frame 20, for example, so that the strength of the rear-side frame 30 against the compressing of the axial direction can be set to be lower than that of the front-side frame 20. Alternatively, the strength of the rear-side frame 30 against the compressing of the axial direction may be set to be lower than that of the front-side frame 20 by using the steel plate having the thinner plate thickness than the front-side frame 20.

According to the rear vehicle-body structure of the vehicle according to the present embodiment, the rear side frame 2 comprises the front-side frame 20 and the rear-side frame 30 which is provided in back of the front-side frame 20 and configured such that the strength thereof against the compressing of its axial direction is lower than that of the front-side frame 20, and the rear end portion of the front-side frame 20 and the front end portion of the rear-side frame 30 are overlapped.

Thereby, since the rear side frame 2 is split into the front-side frame 20 and the rear-side frame 30, and the strengths of respective elements against the compressing of the axial direction of the elements are configured such that the strength of the front-side frame 20 excluding the overlap portion 41 with the rear-side frame 30 is greater than the strength of the rear-side frame 30 excluding the overlap portion 41 with the front-side frame 20, and the strength of the overlap portion 41 of the front-side and rear-side frames 20, 30 is greater than the strength of the front-side frame 20 excluding the overlap portion 41 with the rear-side frame 30, the front-side frame 20 can be crushed and deformed after the rear-side frame 30 which is apart from the cabin has been crushed and deformed in the vehicle rear collision, thereby suppressing any breakage of the rear side frame 2 and improving the safety of passengers in the cabin.

Further, since the No. 5 cross member 5 which is the other vehicle-body member is connected to the overlap portion 41 where the rear end portion of the front-side frame 20 and the front end portion of the rear-side frame 30 are overlapped, that is, connected to the portion which has the high strength against the compressing of the axial direction, the front-side frame 20 excluding the overlap portion 41 and the rear-side frame 30 excluding the overlap portion 41 can be crushed and deformed properly, without blocking crushing and deformation of these frame portions, compared with a case where the No. 5 cross member 5 is connected to the rear side frame 2 at a different position from the overlap portion 41. Consequently, the amount of collision-energy absorption in the vehicle rear collision is so increased that the safety of passengers in the cabin can be improved.

Further, since the No. 5 cross member 5 extends in the vehicle width direction and is joined to the overlap portion 41 which is provided at each of the pair of right-and-left rear side frames 2, the impact energy in the vehicle rear collision can be absorbed by using the right-and-left rear side frames 2, thereby providing the above-described effects properly.

Figure 6:
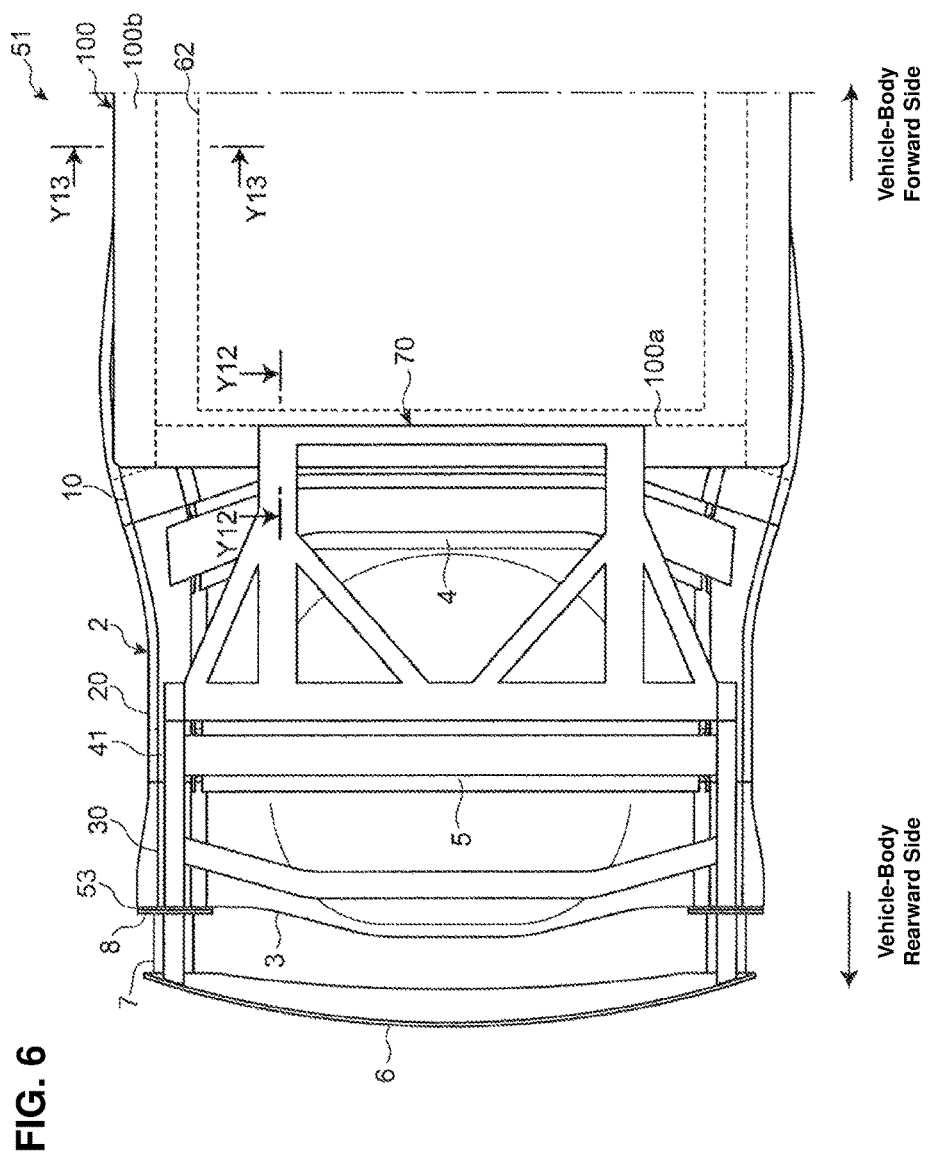
FIG. 6 is a bottom view of the vehicle body to which a rear vehicle-body structure of the vehicle according to a second embodiment of the present invention is applied.
Figure 7:
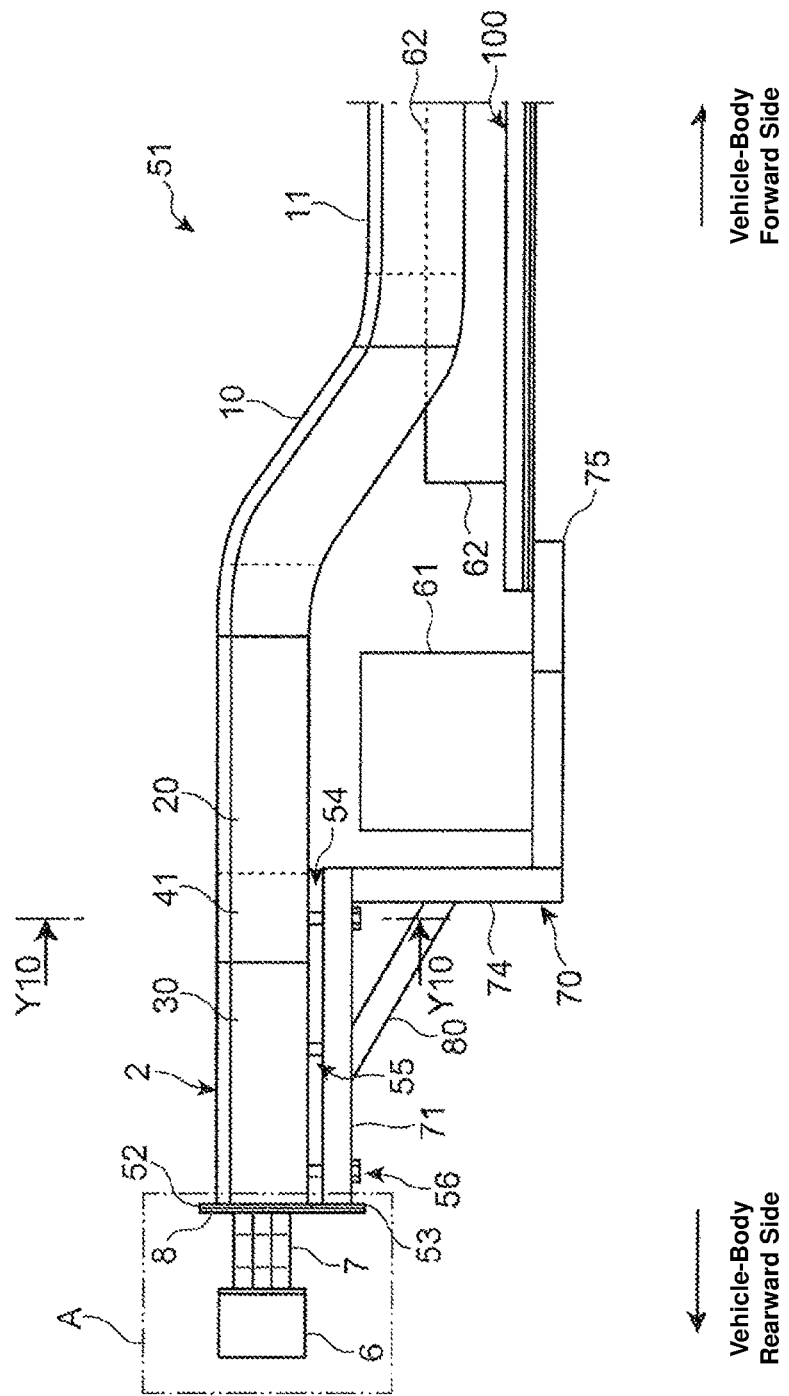
FIG. 7 is a side view of the vehicle body to which the rear vehicle-body structure of the vehicle according to the second embodiment of the present invention is applied.

FIG. 6 is a bottom view of the vehicle body to which a rear vehicle-body structure of the vehicle according to a second embodiment of the present invention is applied, and FIG. 7 is a side view of the vehicle body to which the rear vehicle-body structure of the vehicle according to the second embodiment of the present invention is applied. In FIG. 6, illustration of a drive motor as a drive source is omitted. A vehicle body 51 to which the rear vehicle-body structure of the vehicle according to the second embodiment of the present invention is applied is configured such that a rear sub frame is additionally provided below the rear side frame 2 compared with the vehicle body 1 of the first embodiment, and the same elements/structures as the vehicle body 1 are denoted by the same reference characters, description of which is omitted.

As shown in FIGS. 6 and 7, the vehicle body 51 is also provided with the pair of right-and-left rear side frames 2, the rear floor panel 3 which is laid between the pair of right-and-left rear side frames 2, and the No. 4 cross member 4 and the No. 5 cross member 5 which are laid between the pair of right-and-left rear side frames 2 at the lower-face side of the rear floor panel 3, being spaced apart from each other in the vehicle longitudinal direction, at the vehicle-body rear portion.

The rear side frame 2 comprises the longitudinally-split parts of the front-side frame 20 which is arranged on the forward side of the vehicle body and the rear-side frame 30 which is arranged in back of the front-side frame 20, and the rear end portion of the front-side fame 20 and the front end portion of the rear-side frame 30 are overlapped and joined.

The rear end portion of the front-side frame 20 and the front end portion of the rear-side frame 30 are overlapped in the state where the front end portion of the rear-side frame 30 is inserted into the inside of the rear end portion of the front-side frame 20, and the overlap portion 41 where the rear end portion of the front-side frame 20 and the front end portion of the rear-side frame 30 are overlapped is fixed joined by welding or the like.

In the present embodiment as well, the rear-side frame 30 is configured such that the strength thereof against the compressing of the axial direction is set to be lower than that of the front-side frame 20 by using its thinner steel plate than the front-side frame 20. Thereby, the rear side frame 2 is configured such that the strength of the front-side frame excluding the overlap portion with the rear-side frame is greater than that of the rear-side frame 30 excluding the overlap portion 41, and the strength of the overlap portion 41 is greater than that of the front-side frame 41 excluding the overlap portion 41.

Herein, the rear side frame 2 of the vehicle body 51 of the present embodiment is not provided with the recess portions 43 as the first deformation promotion portion nor the opening portions 45 as the second deformation promotion portion unlike the above-described first embodiment.

Moreover, the No. 5 cross member 5 is connected to the overlap portion 41 where the rear end portion of the frontside frame 20 and the front end portion of the rear-side frame 30 are overlapped in the rear side frame 2, and the No. 5 cross member 5 is connected to the overlap portion 41 of one of the rear side frames 2 and the other rear side frame 2 at its both end portions.

The vehicle body 51 of the present embodiment is a vehicle body of an electric automotive vehicle or the like, and at the vehicle-body rear portion are provided a rear sub frame 70 which supports a drive motor 61 as a drive source and a battery frame 100 which supports a battery 62 to store a power to be supplied to the drive motor 61 and positioned in front of the rear sub frame 70, as shown in FIGS. 6 and 7.

Figure 8:
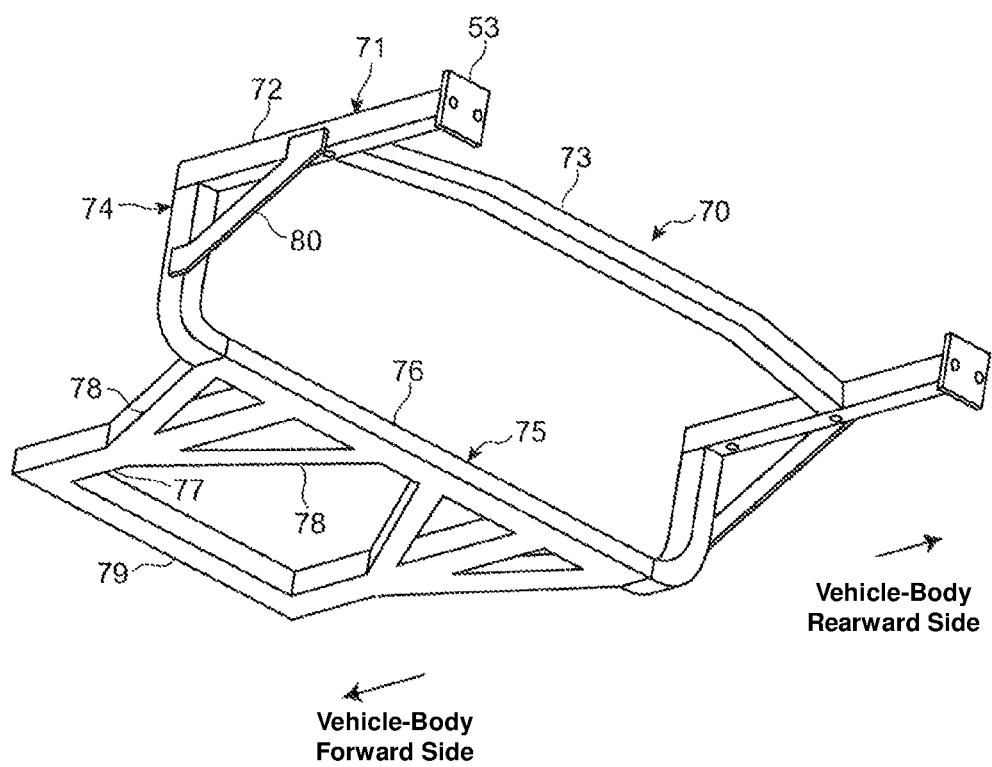
FIG. 8 is a perspective view of a rear sub frame.

FIG. 8 is a perspective view of the rear sub frame. As shown in FIGS. 6-8, the rear sub frame 70 comprises an upper-side horizontal frame 71 which is provided below the right-and-left rear side frames 2 and extends roughly horizontally in the vehicle longitudinal direction along the rear side frames 2, a vertical frame 74 which extends roughly vertically and downward from a front end portion of the upper-side horizontal frame 71, and a lower-side horizontal frame 75 which is connected to a lower end portion of the vertical frame 74 and extends forward and roughly horizontally.

The upper-side horizontal frame 71 comprises right-and-left upper frame portions 72 which extend in the vehicle longitudinal direction along the right-and-left rear side frames 2 and an upper cross portion 73 which extends in the vehicle width direction and is laid between the right-and-left upper frame portions 72, interconnecting respective central portions in the vehicle longitudinal direction, of the right-and-left upper frame portions 72.

Between the upper-side horizontal frame 71 and the vertical frame 74 is provided a bridge portion 80 which interconnects a front end portion of the upper-side horizontal frame 71, specifically a portion of the upper frame portion 72 which is positioned rearward from the front end portion of the upper frame portion 72, and a portion of the vertical frame 74 which is positioned downward from the upper end portion of the vertical frame 74. The bridge portion 80 is connected to the upper frame portion 72 substantially at the same position, in the vehicle longitudinal direction, as a connection portion where the upper cross portion 73 is connected to the upper frame portion 72. The bridge portion 80 is made of a plate member and slants such that its lower side is positioned forward.

The lower-side horizontal frame 75 comprises a lower rear across portion 76 which is connected to lower end portions of the right-and-left vertical frames 74 and extend in the vehicle width direction, a pair of lower frame portions 77 which extend forward from the lower rear cross portion 76, two pairs of slant frames 78 which respectively connect both sides, in the vehicle width direction, of the lower frame portion 77 and the lower frame portion 77, and a lower front cross portion 79 which is connected to front end portions of the two lower frame portions 77 and extend in the vehicle width direction.

In the rear sub frame 70, the upper-side horizontal frame 71, the vertical frame 74, and the lower-side horizontal frame 75 are made from a metal material and have a closed cross section with the same plate thickness. The bridge portion 80 is formed in a plate shape. The upper-side horizontal frame 71, the vertical frame 74, the lower-side horizontal frame 75, and the bridge portion 80 are joined together. Herein, the bridge portion 80 may be configured to have a closed cross section.

Figure 9:
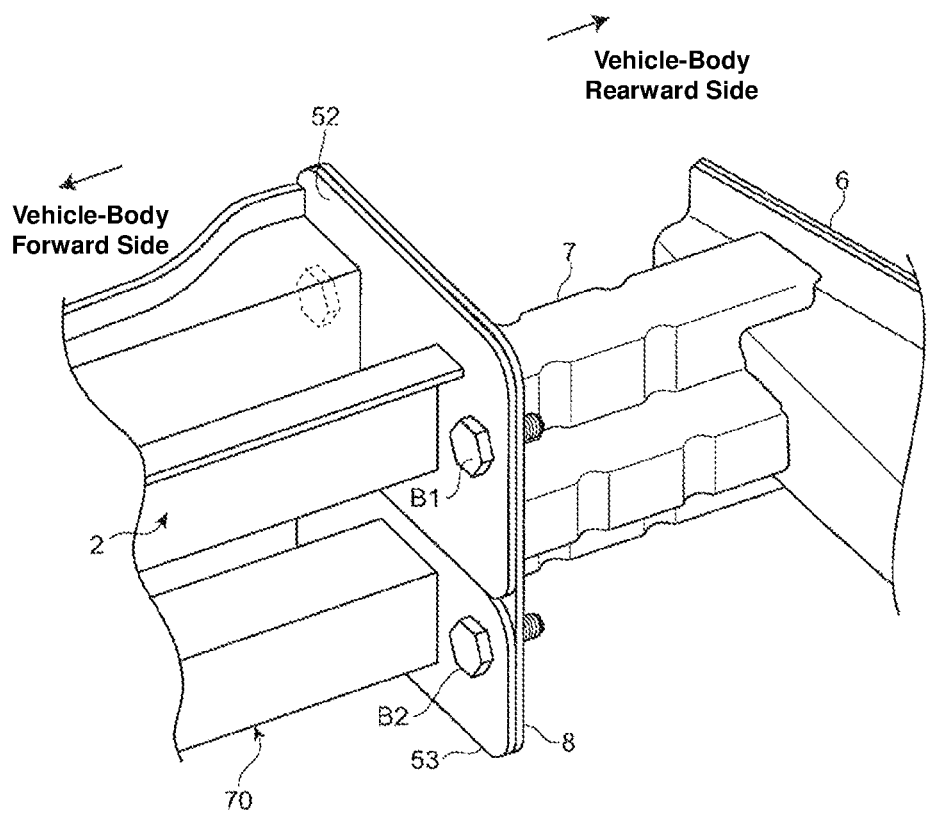
FIG. 9 is a perspective view of the vehicle body showing a portion A of FIG. 7.

FIG. 9 is a perspective view of the vehicle body showing a portion A of FIG. 7, in which illustration of the rear floor panel 3 which is laid between the rear side frames 2 is omitted. As shown in FIG. 9, the first plate member 8 which extends in the direction which is roughly perpendicular to the vehicle longitudinal direction is fixed to the front end portion of the crash can 7 by welding or the like in the present vehicle body 51 as well. A second plate member 52 which extends in the direction which is roughly perpendicular to the vehicle longitudinal direction is fixed to the rear end portion of the rear side frame 2 by welding or the like.

The first plate member 8 is formed in a roughly rectangular shape and has four bolt insertion holes which are formed at a peripheral edge portion thereof. Meanwhile, the second plate member 52 has a roughly-half size of the first plate member 8 and is formed in a roughly rectangular shape, and has two bolt insertion holes which are formed at both sides of a portion thereof which is fixed to the rear side frame 2.

Further, a third plate member 53 which extends in the direction roughly perpendicular to the vehicle longitudinal direction is fixed to the rear end portion of the rea sub frame 70 by welding or the like in the present vehicle body 51. The third plate member 53 has a roughly-half size of the first plate member 8 and is formed in a roughly rectangular shape, and has two bolt insertion holes which are formed at both sides of a portion thereof which is fixed to the rear sub frame 70.

The second plate member 52 and the third plate member 53 are made to contact the first plate member 8 in a state where they are arranged upward and downward, the first plate member 8 and the second plate member 52 are fastened by a bolt B1 inserted into the bolt insertion hole and a nut, and the first plate member 8 and the third plate member 53 are fastened by a bolt B2 inserted into the bolt insertion hole and a nut.

Thereby, the crash can 7 and the rear side frame 2 are joined and also the crash can 7 and the rear sub frame 70 are joined, so that the rear end portion of the rear side frame 2 and the rear end portion of the rear sub frame 70 are connected via the plate members 8, 52, 53.

Figure 10:
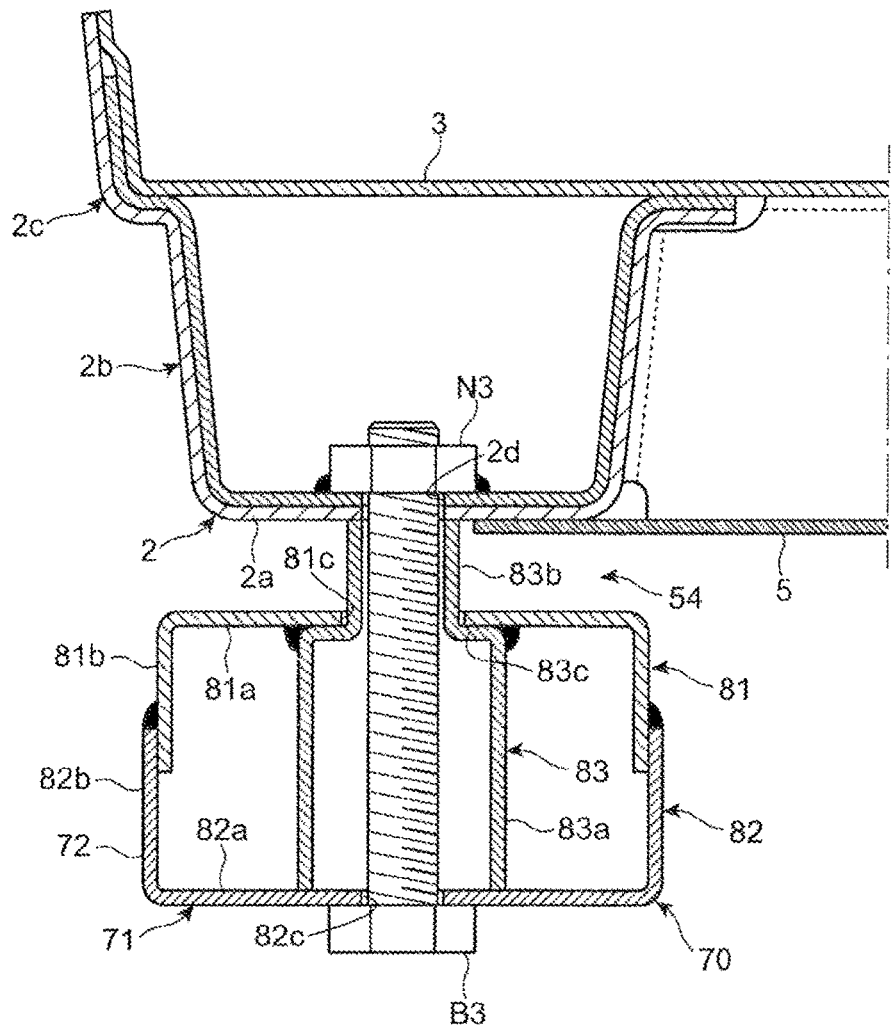
FIG. 10 is a sectional view of the vehicle body which shows a frame connection portion where a rear side frame and a rear sub frame are connected.

FIG. 10 is a sectional view of the vehicle body which shows a frame connection portion where the rear side frame and the rear sub fame are connected, which shows a cross section of the vehicle body taken along line Y10-Y10 of FIG. 7. In the vehicle body 51, as shown in FIG. 7, the rear end portion of the rear side frame 2 and the rear end portion of the rear sub frame 70 are connected, and also there is provided a frame connection portion which connects a portion of the rear side frame 2 which is positioned in front of the rear end portion of the rear side frame 2 and a portion of the rear sub frame 70 which is positioned in front of the rear end portion of the rear sub frame 70, that is—there are provided three frame connection portions 54, 55, 56 according to the present embodiment.

As shown in FIG. 10, at the frame connection portion 54 where the rear side frame 2 and the rear sub frame 70 are connected, a bolt insertion hole 2d is formed at the lower face portion 2a of the rear side frame 2 and also a nut N3 is fixed to an upper face side of the lower face portion 2a of the rear side frame 2 by welding or the like, corresponding to the bolt insertion hole 2d.

Meanwhile, the upper-side horizontal frame 71 of the rear sub frame 70, specifically the upper fame portion 72 comprises a first frame member 81 which includes an upper face portion 81a and both-side side face portions 81b and has a roughly U-shaped cross section and a second frame member 82 which includes a lower face portion 82a and both-side side face portions 82b and has a roughly U-shaped cross section, and the both-side side face portions 81b of the first frame member 81 and the both-side side face portions 82b of the second frame member 82 are respectively joined by welding or the like, thereby forming a closed cross section.

An upper face portion of the upper frame portion 72 is formed by the upper face portion 81a of the first frame member 81, a lower face portion of the upper frame portion 72 is formed by the lower face portion 82a of the second frame member 82, and both-side side face portions of the upper frame portion 72 are formed by the both-side side face portions 81b of the first frame member 81 and the both-side side face portions 82b of the second frame member 82, so that the upper frame portion 72 is configured to have a roughly rectangular shape.

A cylindrical member 83 into which a bolt is inserted is fixed to the upper frame portion 72 by welding or the like. The cylindrical member 83 comprises a base portion 83a which is provided at a one-end side and a tip portion 83b which is provided at the other-end side and has its outer and inner diameters which are smaller than those of the base portion 83a. A step portion 83c is provided between the base portion 83a and the tip portion 83b.

A roughly circular opening portion 81c into which the tip portion 83b of the cylindrical member 83 is inserted is formed at the upper face portion 81a of the upper frame portion 72, and a bolt insertion hole 82c is formed at the lower face portion 82a of the upper frame portion 72. The step portion 83c of the cylindrical member 83 is fixed to the upper face portion 81a by welding or the like in a state where the base portion 83a is arranged inside the upper frame portion 72 and the tip portion 83b projects upward through the opening portion 81c.

As shown in FIG. 10, a bolt B3 is screwed with the nut N3 from the lower side of the upper frame portion 72 in a state where the tip portion 83b of the cylindrical member 83 contacts the lower face portion 2a of the rear side frame 2, so that the rear side frame 2 and the rear sub frame 70 are connected.

The frame connection portions 55, 56 are configured similarly to the frame connection portion 54, and these three frame connection portions 54, 55, 56 are arranged substantially at regular intervals in the vehicle longitudinal direction. The frame connection portions 54, 55, 56 are, as shown in FIG. 7, configured to connect the forward side, the central side, and the rearward side, in the vehicle longitudinal direction, of the upper frame portion 72 to the rear side frame 2, respectively, and the frame connection portion 54 is provided to connect the rear side frame 2 and the rear sub frame 70 at the overlap portion 41 of the rear side frame 2.

Figure 11:
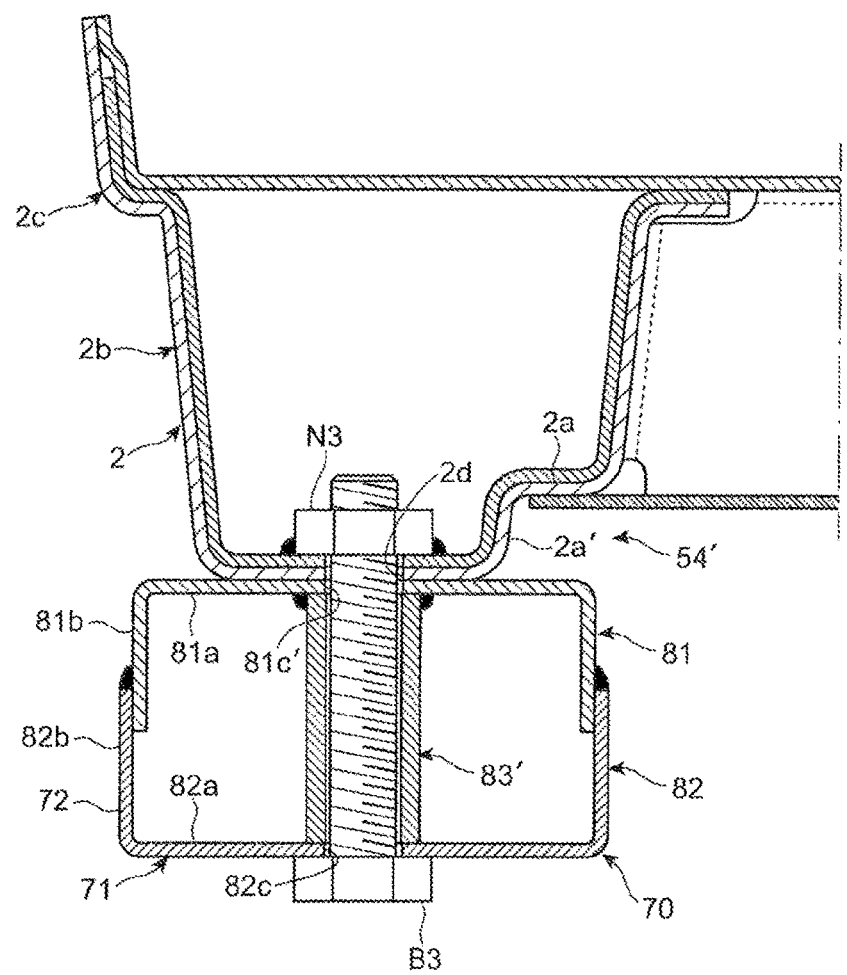
FIG. 11 is a sectional view of the vehicle body which shows a modification of the frame connection portion where the rear side frame and the rear sub frame are connected.

FIG. 11 is a perspective view of a vehicle body which shows a modification of the frame connection portion where the rear side frame and the rear sub frame are connected. In a frame connection portion 54' of FIG. 11, a projection portion 2a' which projects downward is provided at the lower face portion 2a of the rear side frame 2, the bolt insertion hole 2d is formed at the projection portion 2a', and the nut N3 is welded at a position corresponding to the bolt insertion hole 2d.

Meanwhile, at the upper frame portion 72 of the rear sub frame 70, a bolt insertion hole 81c' is formed at the upper face portion 81a, the bolt insertion hole 82c is formed at the lower face portion 82a, and a cylindrical member 83' into which the bolt is inserted is fixed to the upper face portion 81a of the upper frame portion 72.

As shown in FIG. 11, the bolt B3 is screwed with the nut N3 from the lower side of the upper frame portion 72 in a state where the projection portion 2a' provided at the lower face portion 2a of the rear side frame 2 contacts the rear sub frame 70, so that the rear side frame 2 and the rear sub frame 70 are connected.

Thus, part of the lower face portion 2a of the rear side frame 2 is made to project downward, and the bolt and the nut are fastened together in the state where this projection portion contacts the rear sub frame 70, whereby the portion of the rear side frame 2 which is positioned in front of the rear end portion of the rear side frame 2 and the portion of the rear sub frame 70 which is positioned in front of the rear end portion of the rear sub frame 70 can be connected as well.

Figure 12:
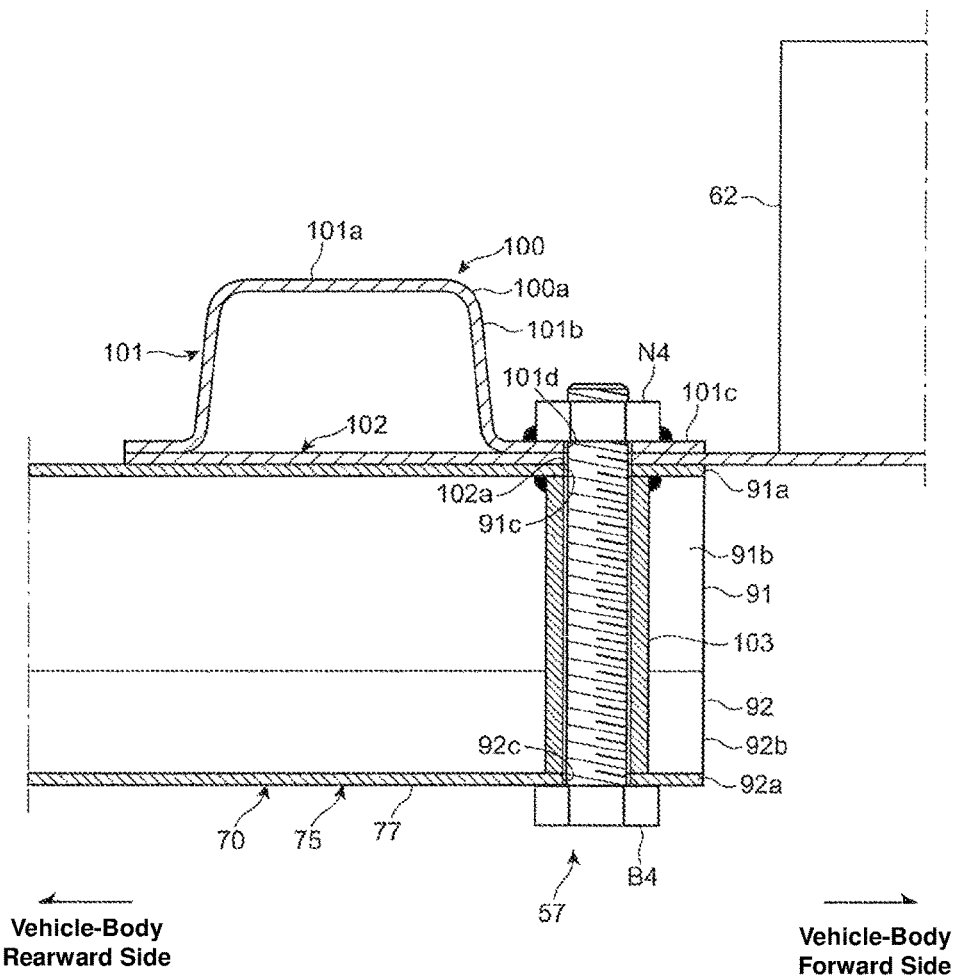
FIG. 12 is a sectional view of the vehicle body which shows a frame connection portion where the rear sub frame and a battery frame are connected.

FIG. 12 is a sectional view showing the frame connection portion where the rear sub frame and the battery frame are connected, which shows the sectional view of the vehicle body taken along line Y12-Y12 of FIG. 6. As shown in FIG. 12, the lower-side horizontal frame 75 of the rear sub frame 70, specifically the lower fame portion 77 also comprises a first frame member 91 which includes an upper face portion 91a and both-side side face portions 91b and has a roughly U-shaped cross section and a second frame member 92 which includes a lower face portion 92a and both-side side face portions 92b and has a roughly U-shaped cross section, and the both-side side face portions 91b of the first frame member 91 and the both-side side face portions 92b of the second frame member 92 are respectively joined by welding or the like, thereby forming a closed cross section.

An upper face portion of the lower frame portion 77 is formed by the upper face portion 91a of the first frame member 91, a lower face portion of the lower frame portion 92 is formed by the lower face portion 92a of the second frame member 92, and both-side side face portions of the lower frame portion 77 are formed by the both-side side face portions 91b of the first frame member 91 and the both-side side face portions 92b of the second frame member 92, so that the lower frame portion 77 is configured to have a roughly rectangular shape.

As shown in FIG. 6, the battery frame 100 comprises a front frame (not illustrated) which is provided at a front side of the vehicle body and extends in the vehicle width direction, a rear frame 100a which is provided at a rear side of the vehicle body and extends in the vehicle width direction, and both-side side frame 100b which respectively interconnect both sides, in the vehicle width direction, of the front frame and both sides, in the vehicle width direction, of the rear frame 100a and extend in the vehicle longitudinal direction.

The front frame, the rear frame 100a, and the both-side side frame 100b respectively comprise, as shown in FIG. 12, a first frame member 101 which comprises an upper face portion 101a, both-side side face portions 101b which extend roughly perpendicularly from both sides of the upper face portion 101a, both-side flange portions 101c which respectively extend outward from the both-side side face portions 101b and has a roughly hat-shaped cross section and a second frame member 102 which is of a flat-plate shape, and the both-side flange portion 101c of the first frame member 101 and the second frame member 102 are overlapped and joined by welding or the like so as to form a closed cross section.

At a frame connection portion 57 where the rear sub frame 70 and the battery frame 100 are connected, the battery frame 100, specifically the rear frame 100a, is configured such that a bolt insertion hole 101d is formed at the flange portion 101c of the first frame member 101, a nut N4 is fixed, by welding or the like, at an upper-face side of the flange portion 101c, corresponding to the bolt insertion hole 101d, and a bolt insertion hole 102a is formed at the second frame member 102.

Meanwhile, at the lower-side horizontal frame 75 of the rear sub frame 70, specifically the lower frame portion 77, a bolt insertion hole 91c is formed at an upper face portion 91a and a bolt insertion hole 92c is formed at a lower face portion 92a, and a cylindrical member 103 into which a bolt is inserted is fixed to the upper face portion 91a of the lower frame portion 77.

Then, as shown in FIG. 12, a bolt B4 is screwed with the nut N4 from the lower side of the lower frame portion 77 in a state where the second frame member 102 of the battery frame 100 contacts the lower frame portion 77 of the rear sub frame 70, whereby the rear sub frame 70 and the battery frame 100 are connected. Likewise, the other-side lower frame portion 77 of the rear sub frame 70 is connected to a rear side of the battery frame 100.

Figure 13:
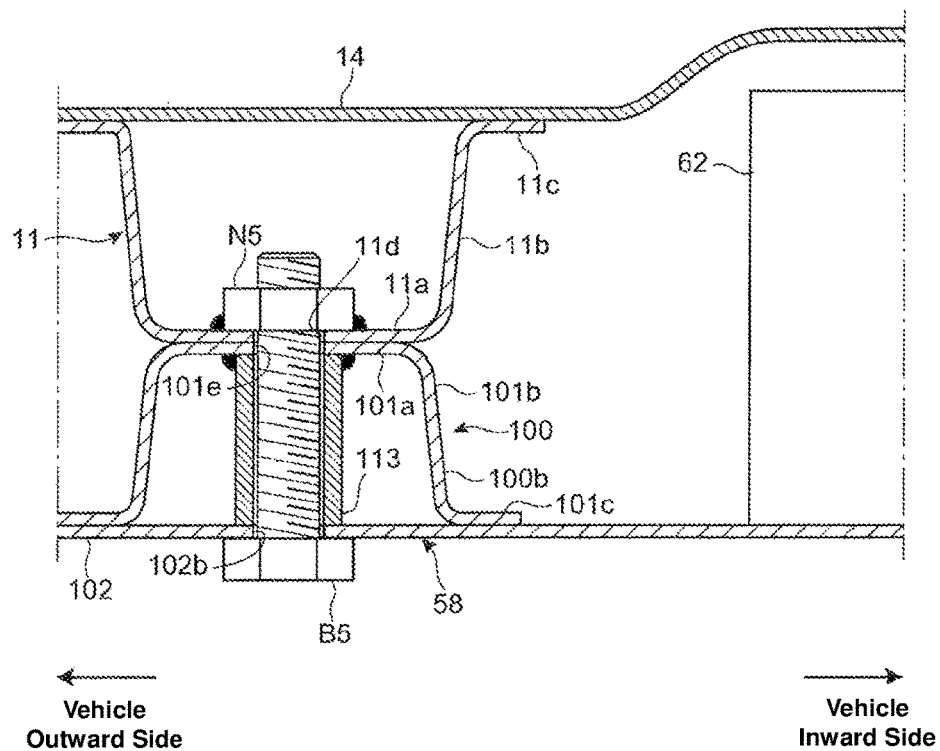
FIG. 13 is a sectional view of the vehicle body which shows a frame connection portion where the battery frame and a front floor frame are connected.

FIG. 13 is a sectional view of the vehicle body which shows the frame connection portion where the battery frame and the front floor frame are connected, which shows the sectional view of the vehicle body taken along line Y13-Y13 of FIG. 6. The battery frame 100, specifically the side fame 100b is arranged along a lower side of the front floor frame 11 and connected to the front floor frame 11.

As shown in FIG. 13, the front floor frame 11 comprises a lower face portion 11a, both-side side face portions 11b which extend roughly perpendicularly from both sides of the lower face portion 11a, both-side flange portions 11e which respectively extend outward from the both-side side face portions 11b and has a roughly hat-shaped cross section, and the both-side flange portions 11e are connected at the lower side of the front floor panel 14.

At a frame connection portion 58 where the battery frame 100 and the front floor frame 11 are connected, a bolt insertion hole 11d is formed at the lower face portion 11a of the front floor frame 11 and a nut N5 is fixed, by welding or the like, at an upper-face side of the lower face portion 11a, corresponding to the bolt insertion hole 11d.

Meanwhile, at the battery frame 100, specifically the side frame 100b, a bolt insertion hole 101e is formed at an upper face portion 101a of the first frame member 101 and a bolt insertion hole 102b is formed at the second frame member 102, and a cylindrical member 113 into which a bolt is inserted is fixed to the upper face portion 101a of the first frame member 101.

Then, as shown in FIG. 13, a bolt B5 is screwed with the nut N5 from the lower side of the battery frame 100 in a state where the upper face portion 101a of the first frame member 101 of the battery frame 100 contacts the lower face portion 11a of the front floor frame 11, whereby the battery frame 100 and the front floor frame 11 are connected.

In the present embodiment, the plural frame connection portions 58 which connect the battery frame 100, specifically the side frame 100b, and the front floor frame 11 are provided to be spaced apart from each other in the vehicle longitudinal direction. Herein, the front frame of the battery frame 100 is a vehicle-body member, such as the front side frame, via the front sub frame which is arranged at a vehicle-body forward side, for example.

According to the vehicle body 51 which is configured as described above as well, in the case where the impact load is applied from behind the vehicle body, when the load is inputted to the rear side frame 2 after the crash can 7 is crushed and deformed, the rear side frame 2 is crushed and deformed in such a manner that the rear-side frame 30 excluding the overlap portion 41 is crushed first and then the front-side frame 20 excluding the overlap portion 41 is crushed before the overlap portion 41 of the front-side frame 20 and the rear-side frame 30 has been crushed, thereby absorbing the impact energy.

Further, in the present vehicle body 51, the load is also inputted to the rear sub frame 70 after the crash can 7 is crushed and deformed, and when the load is inputted to the rear sub frame 70, the rear sub frame 70 is crushed and deformed, thereby absorbing the impact energy.

As described above, according to the rea vehicle-body structure of the vehicle according to the present embodiment as well, the rear side frame 2 comprises the front-side frame 20 and the rear-side frame 30 which is provided in back of the front-side frame 20 and configured such that the strength thereof against the compressing of its axial direction is lower than that of the front-side frame 20, and the rear end portion of the front-side frame 20 and the front end portion of the rear-side frame 30 are overlapped.

Thereby, since the rear side frame 2 is split into the front-side frame 20 and the rear-side frame 30, and the strengths of respective elements against the compressing of the axial direction of the elements are configured such that the strength of the front-side frame 20 excluding the overlap portion 41 with the rear-side frame 30 is greater than the strength of the rear-side frame 30 excluding the overlap portion 41 with the front-side frame 20, and the strength of the overlap portion 41 of the front-side and rear-side frames 20, 30 is greater than the strength of the front-side frame 20 excluding the overlap portion with the rear-side frame 30, the front-side frame 20 can be crushed and deformed after the rear-side frame 30 which is apart from the cabin has been crushed and deformed in the vehicle rear collision, thereby suppressing any breakage of the rear side frame 2 and improving the safety of passengers in the cabin.

Further, since the No. 5 cross member 5 and the rear sub frame 70 are connected to the overlap portion 41 where the rear end portion of the front-side frame 20 and the front end portion of the rear-side frame 30 are overlapped, that is, connected to the portion which has the high strength against the compressing of the axial direction, the front-side frame 20 excluding the overlap portion 41 and the rear-side frame 30 excluding the overlap portion 41 can be crushed and deformed properly, without blocking crushing and deformation of these frame portions, compared with a case where the No. 5 cross member 5 and the rear sub frame 70 are connected to the rear side frame 2 at a different position from the overlap portion 41. Consequently, the amount of collision-energy absorption in the vehicle rear collision is so increased that the safety of passengers in the cabin can be improved.

While the No. 5 cross member 5 and the rear sub frame 70 are connected to the overlap portion 41 where the rear end portion of the front-side frame 20 and the front end portion of the rear-side frame 30 are overlapped in the present embodiment, only the rear sub frame 70 may be connected, or any other vehicle-body member may be connected.

The present invention should not be limited to the above-described embodiments and any other modifications or improvements may be applied within the scope of a spirit of the present invention.

What is claimed is:

1. A rear vehicle-body structure of a vehicle which is provided with a pair of right-and-left rear side frames extending in a vehicle longitudinal direction at a vehicle-body rear portion,
    wherein each of said rear side frames comprises a front-side frame which is configured to be crushed and deformed in an axial direction thereof when an impact load is applied from behind and a rear-side frame which is provided in back of the front-side frame and configured to be crushed and deformed in the axial direction thereof when the impact load is applied from behind such that a strength thereof against compressing of the axial direction thereof is lower than that of the front-side frame,
    a rear end portion of the front-side frame and a front end portion of the rear-side frame are overlapped,
    another vehicle-body member is connected to an overlap portion where the rear end portion of the front-side frame and the front end portion of the rear-side frame are overlapped, wherein said other vehicle-body member is configured to extend in a vehicle width direction and connect to said overlap portion provided at each of said pair of right-and-left rear side frames,
    plural deformation promotion portions are provided at a front part of each of said pair of right-and-left rear side frames which is positioned in front of said overlap portion such that the plural deformation promotion portions are spaced apart from each other in the axial direction of the rear side frame, and plural deformation promotion portions are provided at a rear part of each of said pair of right-and-left rear side frames which is positioned in back of said overlap portion such that the plural deformation promotion portions are spaced apart from each other in the axial direction of the rear side frame, and
    said plural deformation portions which are provided at said front-and-rear parts of the rear side frame positioned in front of and in back of the overlap portion comprise a first group of deformation promotion portions and a second group of deformation promotion portions which are alternately arranged in the axial direction of the rear side frame, the first group of deformation promotion portions comprise plural recess portions which are provided at both-side side face portions of the rear side frame, each of which is configured to extend upwardly from a lower face portion of the rear side frame, the second group of deformation promotion portions comprise plural opening portions which are provided at the lower face portion of the rear side frame.

2. The rear vehicle-body structure of the vehicle of claim 1, wherein said other vehicle-body member extends in the vehicle width direction and is joined to said overlap portion which is provided at each of said pair of right-and-left rear side frames.

3. The rear vehicle-body structure of the vehicle of claim 2, wherein said other vehicle-body member includes a cross member which extends in the vehicle width direction and is laid between said pair of right-and-left rear side frames.

4. The rear vehicle-body structure of the vehicle of claim 3, wherein said rear end portion of the front-side frame and said front end portion of the rear-side frame are overlapped in a state where the front end portion of the rear-side frame is inserted into an inside of the rear end portion of the front-side frame.

5. The rear vehicle-body structure of the vehicle of claim 1, wherein said rear-side frame is made of a steel plate which has a thinner plate thickness than said front-side frame.

6. The rear vehicle-body structure of the vehicle of claim 1, wherein said rear-side frame is made of a steel plate which has a lower tensional strength than said front-side frame.

* * * * *